United States Patent [19]
Schmelz

[11] Patent Number: 5,833,932
[45] Date of Patent: Nov. 10, 1998

[54] CATALYTIC CONVERTER FOR NITROGEN OXIDE REDUCTION IN THE EXHAUST GAS OF AN INTERNAL COMBUSTION ENGINE

[75] Inventor: Helmut Schmelz, Prien, Germany

[73] Assignee: Siemens Aktiengesellschaft, Munich, Germany

[21] Appl. No.: 953,964

[22] Filed: Oct. 20, 1997

Related U.S. Application Data

[63] Continuation of Ser. No. 490,115, Jun. 12, 1995, abandoned, which is a continuation of Ser. No. 218,358, Mar. 25, 1994, abandoned.

[30] Foreign Application Priority Data

Mar. 26, 1993 [DE] Germany .......................... 43 09 891.6

[51] Int. Cl.$^6$ .................................................. B01D 53/34
[52] U.S. Cl. .......................... 422/180; 422/171; 422/172; 422/176; 422/180; 422/211; 422/222; 60/301; 60/303
[58] Field of Search .................................... 422/171–172, 422/176–177, 180, 211, 222; 60/299, 301, 303; 55/523, DIG. 30; 423/213.7; 502/439, 527.18

[56] References Cited

U.S. PATENT DOCUMENTS

| | | | |
|---|---|---|---|
| 3,768,982 | 10/1973 | Kitzner et al. | 422/174 |
| 4,118,199 | 10/1978 | Völker et al. | 422/171 |
| 4,390,355 | 6/1983 | Hammond, Jr. et al. | 55/523 |
| 4,665,051 | 5/1987 | Nonnenmann | 422/180 |
| 5,229,080 | 7/1993 | Abe et al. | 422/174 |
| 5,270,277 | 12/1993 | Hums | 502/248 |
| 5,328,774 | 7/1994 | Maus et al. | 428/593 |

FOREIGN PATENT DOCUMENTS

| | | |
|---|---|---|
| 218070 | 4/1987 | European Pat. Off. . |
| 220416 | 5/1987 | European Pat. Off. . |
| 3536315 | 4/1987 | Germany . |
| 3813312 | 11/1989 | Germany . |
| 3826137 | 2/1990 | Germany . |
| 4042079 | 7/1991 | Germany . |
| 4025587 | 2/1992 | Germany . |
| 4032085 | 4/1992 | Germany . |
| 54-13815 | 2/1979 | Japan . |
| 61-18438 | 1/1986 | Japan . |
| 63-18123 | 1/1988 | Japan . |
| 32-58326 | 11/1991 | Japan . |

OTHER PUBLICATIONS

MTU Focus Feb. 1993 (Effelsberg et al), "Investigations on Exhaust Treatment in Large Diesel Engines".

*Primary Examiner*—Hien Tran
*Attorney, Agent, or Firm*—Herbert L. Lerner; Laurence A. Greenberg

[57] ABSTRACT

A catalytic converter assembly for nitrogen oxide reduction in the exhaust gas of an internal combustion engine, in particular a Diesel engine, includes a catalytic converter through which exhaust gas can flow in a given flow direction. The catalytic converter has a catalyst carrier and a catalytically active layer. The catalytic converter has a reducing agent storage capacity per unit of length being increased in the given flow direction.

14 Claims, 3 Drawing Sheets

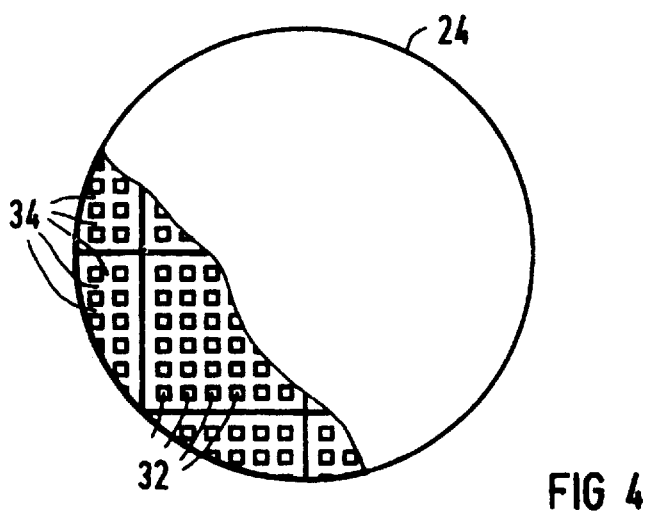

CATALYTIC CONVERTER FOR NITROGEN OXIDE REDUCTION IN THE EXHAUST GAS OF AN INTERNAL COMBUSTION ENGINE

CROSS-REFERENCE TO RELATED APPLICATION

This application is a continuation of application Ser. No. 08/490,115, filed Jun. 12, 1995, now abandoned; which is a continuation of application Ser. No. 08/218,358, filed Mar. 25, 1994, now abandoned.

BACKGROUND OF THE INVENTION

Field of the Invention

The invention relates to a catalytic converter for nitrogen oxide reduction in the exhaust gas of an internal combustion engine, in particular a Diesel engine.

In the combustion of fossil fuels in internal combustion engines, nitrogen oxides form because of the thermodynamic conditions prevailing during combustion. The nitrogen oxides contribute substantially to the environmental problems of air pollution and acid rain.

In order to lower the nitrogen oxide content in exhaust gases of internal combustion engines, it is known to employ a number of primary and secondary provisions for nitrogen oxide reduction. Primary provisions include all those provisions that are taken in order to keep the nitrogen oxide development as low as possible during the combustion of the fossil energy carrier with oxygen from the air. Secondary provisions include all those in which the nitrogen oxides once formed are eliminated catalytically or in other ways employing process technology.

For that purpose, for instance in exhaust gases of Otto engines, catalytic converters are, for instance, known that are coated with platinum and/or other noble metals, and at which the nitrogen oxides are reduced to molecular nitrogen oxide with hydrocarbons and carbon monoxide that are contained in the exhaust gas and with oxygen from the air. It is also known to remove nitrogen from the exhaust gas of Diesel and lean—burning engines by using catalytic converters that work according to the method of selective catalytic reduction (SCR). In such so-called deNOx catalytic converters, the nitrogen oxides are converted into nitrogen and water at the catalytically active centers of the catalytic converter, by using ammonia having been previously introduced into the exhaust gas. The ammonia is not carried in the vehicle but rather can be formed as needed, for instance from an aqueous urea solution. Oxides of one or more of the elements iron, copper, titanium, vanadium, tungsten, molybdenum, chromium, manganese, cerium, and so forth, are typically used as catalytically active material.

Since the aforementioned engines are operated in motor vehicles in traffic at variable load and with sometimes very major changes in load, there is currently no way to attain simultaneously high separation rates for nitrogen oxides and a vanishingly slight slip or escape of reducing agents such as ammonia that is unconsumed in the catalytic conversion of the nitrogen oxides for the various operating states of the engines.

SUMMARY OF THE INVENTION

It is accordingly an object of the invention to provide a catalytic converter for nitrogen oxide reduction in the exhaust gas of an internal combustion engine, which overcomes the hereinafore-mentioned disadvantages of the heretofore-known devices of this general type and with which high separation rates for nitrogen oxides with simultaneously low reducing agent slip or escape are achieved for all operating states of the engine.

With the foregoing and other objects in view there is provided, in accordance with the invention, a catalytic converter assembly for nitrogen oxide reduction in the exhaust gas of an internal combustion engine, in particular a Diesel engine, comprising a catalytic converter through which exhaust gas can flow in a given flow direction, the catalytic converter having a catalyst carrier and a catalytically active layer, the catalytic converter having a reducing agent quantity storage capacity per unit of length being increased in the given flow direction.

The term "reducing agent" is intended to mean any substance that is itself oxidized in the reduction of the nitrogen oxides, such as carbon monoxide, hydrocarbons, alcohol, and substances convertible into ammonia. The reducing agent may be stored in the catalytically active layer and/or in the catalyst carrier.

The result achieved in this way is that the parts of the catalytic converter located first in the flow direction of the exhaust gas have a relatively low storage capacity for the reducing agent. This dictates better light-off performance of the catalytic converter as compared with a larger storage capacity of the catalytic converter in that region. This also means that after consumption of the stored reducing agent, because of its low storage capacity, the catalytic converter can be refilled with the reducing agent rapidly and thus rapidly regains its original operating state. The fact that the storable reducing agent quantity increases in the flow direction of the exhaust gas assures that sufficient reducing agent for nitrogen oxide reduction can be furnished even despite a high expulsion of nitrogen oxide on the part of the engine. Moreover, it is possible in this way to create so-called reducing agent buffers in the regions of high storable reducing agent quantities. These buffers build up during normal operation as a result of the decreasing concentration of reducing agent in the flow direction of the exhaust gas and the attendant decreasing storage of reducing agent. Since the storage capacity of the catalytic converter for the reducing agent decreases as the temperature increases, these buffers serve to store the quantities of reducing agent desorbed by the catalyst, for instance as a consequence of a drastic temperature increase of the exhaust gas. This effectively prevents the reducing agent from being carried out of the catalytic converter.

In accordance with another feature of the invention, the thickness of the catalytically active layer increases in the flow direction of the exhaust gas. This increase can proceed either continuously or discontinuously. As a result, the storage capacity for the reducing agent of the catalytically active layer can be utilized to achieve the aforementioned effect.

In accordance with a further feature of the invention, the thickness of the catalytically active layer at the entry of gas has approximately the thickness of the reaction zone. This is done in order to attain simple adjustment of the reducing agent content in the catalytically active layer and fast light-off performance of the catalytic converter. The thickness of the reaction zone is defined as the depth of material in which the concentration of nitrogen oxides has dropped to virtually zero.

In accordance with an added feature of the invention, the thickness of the catalytically active layer at the gas exit is a multiple of the thickness of the reaction zone. This is done in order to furnish sufficient reducing agent for converting the nitrogen oxides even in the presence of major load demands and at the same time to avoid a slip or escape of reducing agent.

In accordance with an additional feature of the invention, the specific surface area of the catalytically active layer increases in the flow direction of the exhaust gas. As a result, the reducing agent can be adsorbed to an increased extent at the specific surface area, which increases in the flow direction of the exhaust gas, and as a result the requirement for an increase in the quantity of reducing agent storable per unit of length is met. This increase can take place either continuously or discontinuously.

In accordance with yet another feature of the invention, the specific surface area at the gas entry is adjusted to from 20 to 100 m$^2$/g of catalytically active substance, and/or the specific surface area at the gas exit is adjusted to from 40 to 600 m$^2$/g of catalytically active substance. The increase in the specific surface area of the catalytic converter can be attained, for instance, by coating the catalytic converter with zeolites and/or aluminum oxide.

In accordance with again another feature of the invention, the catalyst carrier is a metal carrier to which the catalytically active layer is applied.

In accordance with again a further feature of the invention, the catalyst carrier is a ceramic carrier to which the catalytically active layer is applied.

In accordance with again an added feature of the invention, the catalytic converter is a fully ceramic honeycomb having a wall with a thickness, and the wall thickness is increased in the given flow direction.

In accordance with again an additional feature of the invention, the catalytic converter is a fully ceramic honeycomb having a number of cells per unit of surface area being increased in the given flow direction.

In accordance with yet an added feature of the invention, the catalytic converter includes a first partial catalytic converter disposed upstream and an adjoining second partial catalytic converter disposed downstream in the given flow direction, the first partial catalytic converter has the catalyst carrier in the form of a metal carrier and has the catalytically active layer applied to the metal carrier, and the second partial catalytic converter is a fully ceramic honeycomb.

In accordance with yet a further feature of the invention, there are provided means in the catalytic converter for generating turbulence flows of the exhaust gas. This is done in order to carry the reducing agent especially quickly from the gas phase to the surface of the catalytic converter in general, and particularly in regions of the catalytic converter in which only relatively small quantities of reducing agent are storable. In metal sheet—type catalytic converters, these are deflector elements, such as tabs placed obliquely, while in honeycomb catalytic converters they are laterally staggered structures such as corrugated channels, staggered channel segments and similar structures. This avoids disadvantages such as transport problems and sacrifices in activity that occur if there is a predominantly laminar flow of exhaust gas. Due to the thus-generated turbulent flow of exhaust gas, the transport of the nitrogen oxides into the reaction zone is also accelerated, which dictates high activity of the catalytic converter even during equilibrium operation.

In accordance with yet an added feature of the invention, there is provided a partial catalytic converter being constructed as an oxidation catalytic converter and being disposed downstream of the catalytic converter as seen in the given flow direction.

In accordance with yet an additional feature of the invention, the catalytically active layer includes titanium dioxide and at least one additive selected from the group consisting of tungsten oxide, molybdenum oxide and vanadium oxide.

In accordance with a concomitant feature of the invention, the catalytically active layer includes a phase having the total formula $V_xMo_yO_{32-z}$, where $x+y<12$; $x, y>1$; and $z<1$.

Other features which are considered as characteristic for the invention are set forth in the appended claims.

Although the invention is illustrated and described herein as embodied in a catalytic converter for nitrogen oxide reduction in the exhaust gas of an internal combustion engine, it is nevertheless not intended to be limited to the details shown, since various modifications and structural changes may be made therein without departing from the spirit of the invention and within the scope and range of equivalents of the claims. The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a longitudinal-sectional view of the catalytic converter, which is taken along the line IV—IV of FIG. 1, in the direction of the arrows.

DESCRIPTION OF THE PREFERRED EMBODIMENTS

Figure 1:
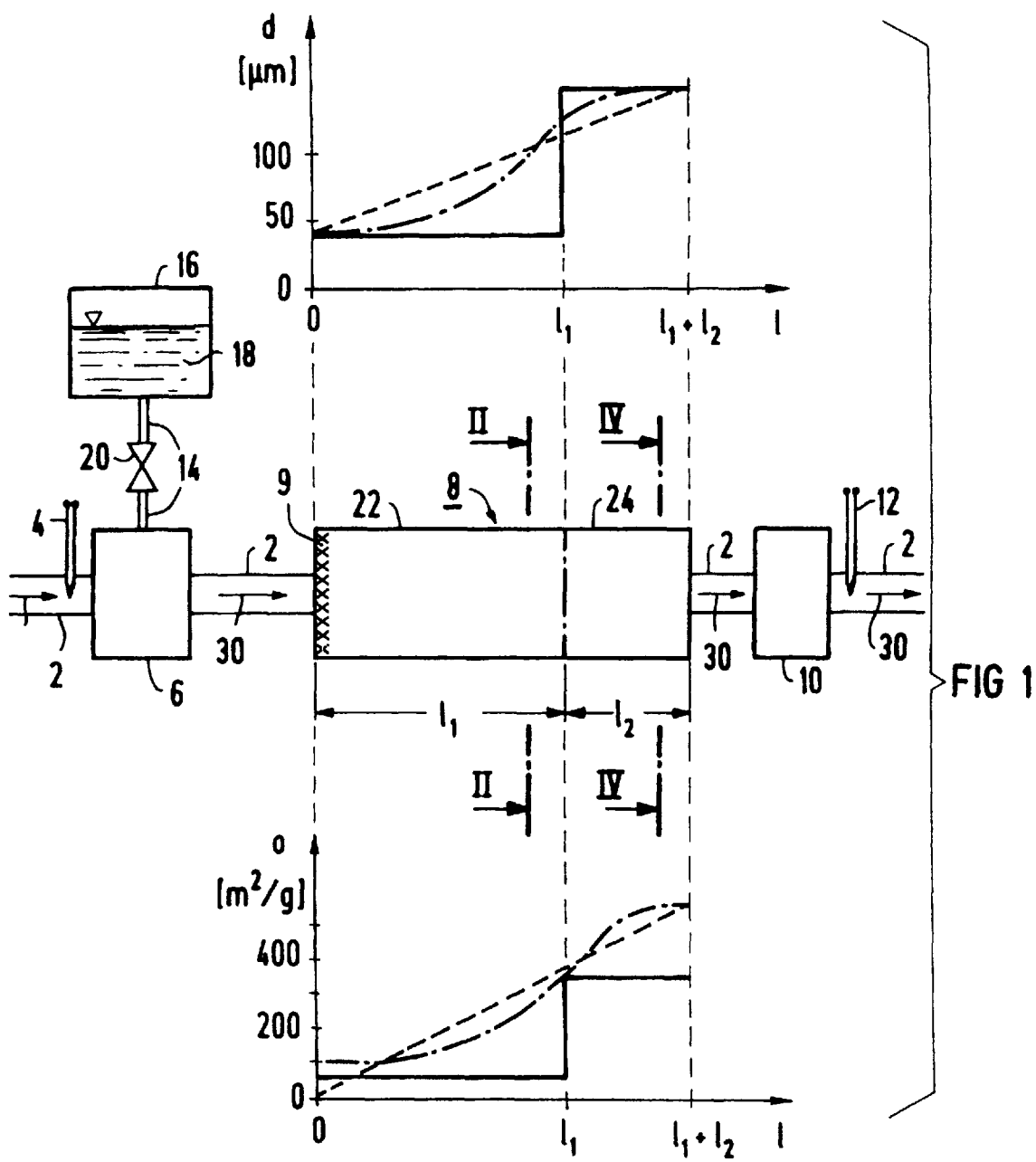
FIG. 1 is a fragmentary, diagrammatic, elevational view with accompanying graphs of an exhaust gas line of a 300 kW charge-cooled Diesel truck engine having a catalytic converter according to the invention.

Referring now to the figures of the drawing in detail and first, particularly, to FIG. 1 thereof, there is seen a portion of an exhaust line 2 of a Diesel truck engine, which is not otherwise shown. Built into the exhaust line 2, in this order are a temperature sensor 4, a hydrolysis catalytic converter 6, a deNOx catalytic converter 8, means for generating turbulence flows of an exhaust gas 30, i.e. deflector elements 9, an oxidation catalytic converter 10, and a further temperature sensor 12. Connected to the hydrolysis catalytic converter 6 is a reducing agent supply line 14, which begins at a supply container 16 for a reducing agent 18 and discharges into the hydrolysis catalytic converter 6 through an injection valve 20. The reducing agent 18 is a substance that is convertible into ammonia, such as an aqueous urea solution, which can be carried in the vehicle without danger. The deNOx catalytic converter 8 includes first and second partial catalytic converters 22, 24, which differ from one another in their construction.

Figure 2:
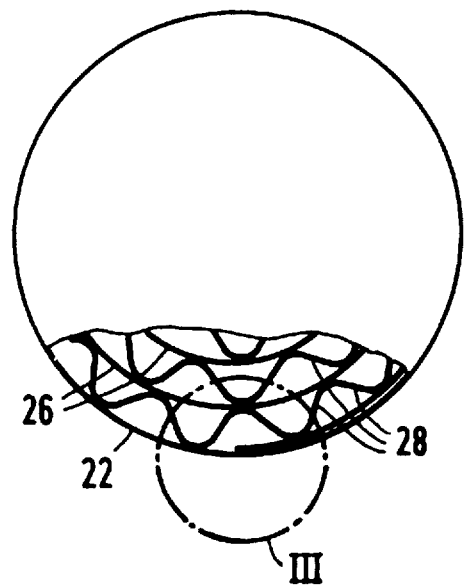
FIG. 2 is an enlarged, longitudinal-sectional view of the catalytic converter, which is taken along a line II—II of FIG. 1, in the direction of the arrows.
Figure 3:
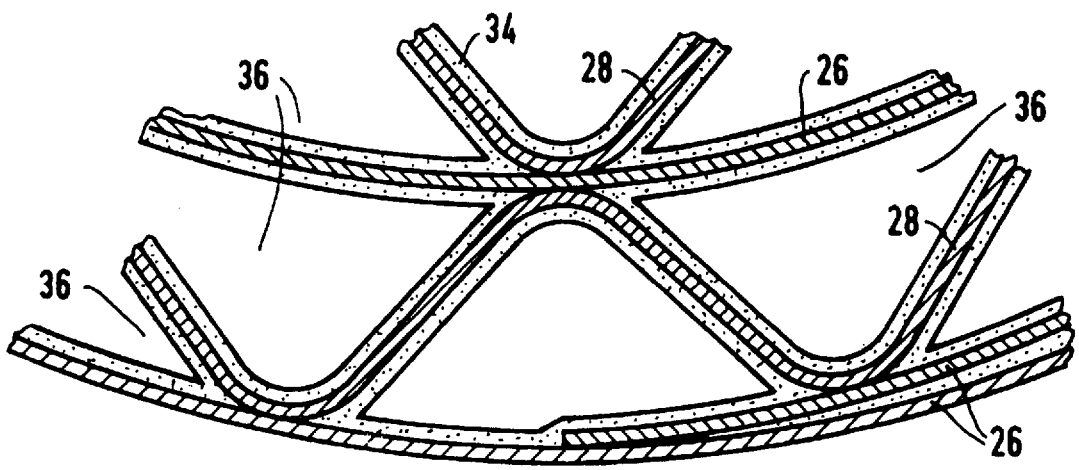
FIG. 3 is an enlarged, fragmentary, longitudinal-sectional view of a portion III of FIG. 2.

As is shown in FIG. 2, the partial catalytic converter 22 includes a spirally disposed flat metal sheet or sheet metal layers 26, made of a stainless special steel or a hot conductor alloy. A corrugated sheet or sheet metal layers 28 that supports the entire spiral structure of the sheet 26 is placed between individual layers of the sheet 26. The sheet 28 is likewise made of a stainless special steel or a hot conductor alloy and like the sheet 26 has a thickness of approximately 40 μm. A catalytically active layer 34 seen in FIG. 3 is applied to both the sheet 26 and the corrugated sheet 28 and has a thickness of approximately 40 μm in the exemplary embodiment and a specific surface area of approximately 50 m$^2$/g, which corresponds to a primary particle size of approximately 15 nm in the starting material. In the exemplary embodiment, the partial catalytic converter or element 22 has a length 11 of approximately 30 cm. Titanium oxide (TiO2), with one or more of the additives molybdenum oxide (MoO3), tungsten oxide (WO) and vanadium oxide (V2O5), is used as the catalytically active substance in the catalytically active layer 34. It is also conceivable to use a phase of the total formula VxMoyO32-z, where x, y>1, x+y<12, z<1, as an especially catalytically active sub-stance in the catalytically active layer 34. In the exemplary embodiment, the partial catalytic converter or element 22 has a substantially laminar flow through it. Deflector elements for exhaust gas 30 may also be provided on the sheets 26 and 28, thereby amplifying the interaction of the reducing agent and the nitrogen oxides in the exhaust gas 30 with the catalytically active layer 34.

The course of a thickness d of the catalytically active layer 34 is plotted as a stairstep course in the diagram above the catalytic converter 8. However, the thickness d of the catalytically active layer 34 could also extend along the dotted or dot-dashed line shown in the graph. What has just been said about the thickness d can also be applied to the course of the specific surface area o along the catalytic converter 8. In the exemplary embodiment, the stairstep course is plotted in the diagram below the catalytic converter.

FIG. 3 shows the portion III outlined in FIG. 2, on a larger scale. Also shown on this scale for purposes of clarity is the catalytically active layer 34, which is applied to the sheets 26, 28, for example by immersion or by being rolled on. The exhaust gas 30 flows through gas voids 36 that have remained between the sheets 26, 28.

FIG. 4 shows a section taken along the line IV—IV in FIG. 1 through the partial catalytic converter 24 of the deNOx catalytic converter 8. This partial catalytic converter 24, which is disposed downstream of the partial catalytic converter or element 22 in the flow direction of the exhaust gas 30, is constructed as a fully ceramic honeycomb body in the exemplary embodiment. Walls of the honeycomb body act as both a catalyst carrier and as a catalytically active layer at the same time. The thickness of the honeycomb walls in the exemplary embodiment is approximately 300 μm, which is a multiple of the thickness of a reaction zone. The thickness of the reaction zone is defined as the depth in the catalytically active layer at which the nitrogen oxide content has dropped to virtually zero. The thickness of the reaction zone is dependent, among other factors, on the NOx concentration and on the pore radii, and in general it is between 5 and 200 μm. In the exemplary embodiment, it is approximately 40 μm. The specific surface area of the honeycomb material (catalytically active material) is approximately 100 m$^2$/g, which is equivalent to a primary particle size of the starting material of approximately 30 nm. The catalytically active layer 34 includes the same materials that were already named above for the partial catalytic converter 22. The specific surface areas of the catalytically active layer 34 are thus adjusted within a preferred range of from 20 to 100 m$^2$/g at the entrance of the exhaust gas into the partial catalytic converter 22 and within a preferred range from 40 to 600 m$^2$/g at the exit of exhaust gas from the partial catalytic converter 24. Large specific surface areas of the catalytically active layer 34 may also be produced, for instance, by means of an additional coating of the partial catalytic converters or elements 22, 24 with zeolites and/or with aluminum oxide. During operation of the Diesel engine, which is not shown in further detail, the exhaust gas 30 that contains approximately 550 ppm of nitrogen oxides, for instance, and has a mass flow rate of approximately 350 g/h and a temperature of approximately 280° C., flows through the exhaust gas line 2. Through the use of the injection valve 20, the quantity of ammonia required for catalytic conversion of the nitrogen oxides is injected in the form of the aqueous urea solution 18 into the hydrolysis catalytic converter 6, and as a result the urea is hydrolyzed to make ammonia and water. The exhaust gas 30 mixed with ammonia then flows into the deNOx catalytic converter 8 and in it first flows into the catalytic converter element 22. Due to the relatively slight thickness of the catalytically active layer 34, this partial catalytic converter or element, while it can store only relatively little ammonia, has rapid light-off performance and can also be filled relatively quickly with ammonia after possibly having been empty. The major portion of the nitrogen oxides contained in the exhaust gas is already converted into nitrogen and water in this element 22 with the ammonia, by contact with the catalytically active layer 34. The nitrogen oxides that are not yet catalytically converted in the partial catalytic converter or element 22 are then converted as they flow through the partial catalytic converter or element 24. Ammonia carried out of the partial catalytic converter or element 24 along with the exhaust gas 30 is catalytically converted by means of the oxidation catalytic converter 10 along with hydrocarbons and carbon monoxide also contained in the exhaust gas, so that a largely pollutant-free exhaust gas 30 is delivered to a non-illustrated muffler. If a positive load jump occurs, the nitrogen oxide concentration can rise to approximately 1300 ppm, the air flow rate can rise to approximately 1600 g/h, and the exhaust gas temperature can rise to approximately 540° C. On one hand this reinforces the reaction of nitrogen oxides and ammonia and causes a lowering of the quantity of ammonia stored in the deNOx catalytic converter 8. On the other hand, ammonia is released, in accordance with the rise in temperature of the exhaust gas 30, which causes a decreasing storage capacity of the catalytically active layer 34 for ammonia.

Since the partial catalytic converter or element 24, as compared with the partial catalytic converter or element 22, has a greater thickness of the catalytically active layer 34 over a length 12 of approximately 15 cm chosen in the exemplary embodiment and has twice the specific surface area per unit of length, this catalytic converter element 24 serves as a collecting reservoir for the ammonia desorbed because of the rise in temperature of the exhaust gas 30. Without these properties of the deNOx catalytic converter 8 according to the invention, such large quantities of ammonia would be desorbed when positive load jumps occur, that even the downstream oxidation catalytic converter 10 would be unable to prevent considerable ammonia slip or escape and therefore a considerable increase in odor and air pollution. Through the disposition of a metal sheet-type catalytic converter as the first partial catalytic converter 22 upstream of a honeycomb catalytic converter as the second partial catalytic converter 24 according to the invention, the thermal strain on the wholly ceramic honeycomb body caused by temperature jumps is moreover attenuated. This is because the sheets 26, 28 in the partial catalytic converter 22 smooth out overly large temperature changes due to their thermal conduction and thermal radiation characteristics.

Nevertheless, it would be equally conceivable to replace the catalytic converter element 22 with wholly ceramic honeycomb catalytic converters having a wall thickness which increases in the flow direction of the exhaust gas 30 or having a number of cells per unit of surface area which increases in the flow direction of the exhaust gas 30.

It should additionally be noted that the specific storage capacity of the catalytically active layer 34 in the exemplary embodiment is approximately 3 g of ammonia per kg of catalyst for a temperature of 250° C., and approximately 0.5 g of ammonia per kg of catalyst at a temperature of 500° C. Besides the urea solution used in the exemplary embodiment, in principle all substances that can be relatively easily converted into ammonia are usable as the reducing agent 18. Alternatively, however, hydrocarbons, carbon monoxide, and so forth are also conceivable.

Alternatively to the metal sheets 26, 28 being used in the catalytic converter 22 as carriers for the catalytically active layer 34, a ceramic carrier, for instance of aluminum oxide Al2O3 or similar minerals, may also be used.

I claim:

1. A catalytic converter assembly for nitrogen oxide reduction in the exhaust gas of an internal combustion engine, comprising a catalytic converter with a gas inlet and a gas outlet defining a flow direction for exhaust gas flowing through said catalytic converter, said catalytic converter including a catalyst carrier and a catalytically active layer for reducing nitrogen oxides disposed on said catalyst carrier, said catalytically active layer having a thickness increasing in said flow direction from said gas inlet towards said gas outlet, and a reducing agent storage capacity per unit length increasing in said flow direction.

2. The catalytic converter assembly according to claim 1, wherein said catalytically active layer has a reaction zone within which a reduction of nitrogen oxide occurs, the thickness of said catalytically active layer at said gas inlet being 5 to 200 $\mu$m.

3. The catalytic converter assembly according to claim 1, wherein said catalytically active layer has a reaction zone within which a reduction of nitrogen oxide occurs, the thickness of said catalytically active layer at said gas outlet being more than 200 $\mu$m.

4. The catalytic converter assembly according to claim 1, wherein said catalytically active layer has a reaction zone within which a reduction of nitrogen oxide occurs, the thickness of said catalytically active layer at said gas inlet being 5 to 200 $\mu$m, and the thickness of said catalytically active layer at said gas outlet being more than 200 $\mu$m.

5. The catalytic converter assembly according to claim 1, wherein said catalytically active layer has a catalytically active substance, and a specific surface area of said catalytically active substance at said gas outlet is adjusted to between 40 and 600 $m^2$/g.

6. The catalytic converter assembly according to claim 1, wherein said catalyst carrier is a metal carrier.

7. The catalytic converter assembly according to claim 1, wherein said catalyst carrier is a ceramic carrier.

8. The catalytic converter assembly according to claim 1, wherein said catalytic converter is a ceramic honeycomb.

9. The catalytic converter assembly according to claim 1, wherein said catalytic converter includes a first catalytic converter disposed upstream and an adjoining second catalytic converter disposed downstream in said flow direction, said first catalytic converter has said catalyst carrier in the form of a metal carrier and has said catalytically active layer disposed on said metal carrier, and said second catalytic converter is a ceramic honeycomb.

10. The catalytic converter assembly according to claim 1, including means disposed at the gas inlet for generating turbulent flows of the exhaust gas.

11. The catalytic converter assembly according to claim 1, including a further catalytic converter constructed as an oxidation catalytic converter and disposed downstream of said catalytic converter in said given flow direction.

12. The catalytic converter assembly according to claim 1, wherein said catalytically active layer includes titanium dioxide and at least one additive selected from the group consisting of tungsten oxide, molybdenum oxide and vanadium oxide.

13. The catalytic converter assembly according to claim 1, wherein said catalytically active layer includes a phase having the total formula $V_xMo_yO_{32-z}$, where x+y<12; x, y>1; and z<1.

14. A catalytic converter assembly for nitrogen oxide reduction in the exhaust gas of an internal combustion engine, comprising a catalytic converter with a gas inlet and a gas outlet defining a flow direction for exhaust gas flowing through said catalytic converter, said catalytic converter including a catalyst carrier and a catalytically active layer for reducing nitrogen oxides disposed on said catalyst carrier, said catalytically active layer having a thickness increasing in said flow direction from a thickness of between 5 and 200 $\mu$m at said gas inlet to a thickness of more than 200 $\mu$m at said gas outlet, and a reducing agent storage capacity per unit length increasing in said flow direction.

* * * * *